US008336076B2

(12) United States Patent
Oh et al.

(10) Patent No.: US 8,336,076 B2
(45) Date of Patent: Dec. 18, 2012

(54) SYSTEM AND METHOD FOR POSITIONING MULTIPLE BROADCAST CONTENT ON A USER INTERFACE

(75) Inventors: Seung-Hun Oh, Gwangju (KR); Il-Kyun Park, Seoul (KR); Ho-Young Song, Daejeon (KR); Bong-Tae Kim, Daejeon (KR); Byong-Kwon Moon, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 345 days.

(21) Appl. No.: 12/678,623

(22) PCT Filed: Mar. 31, 2008

(86) PCT No.: PCT/KR2008/001792
§ 371 (c)(1),
(2), (4) Date: Mar. 17, 2010

(87) PCT Pub. No.: WO2009/038262
PCT Pub. Date: Mar. 26, 2009

(65) Prior Publication Data
US 2010/0218230 A1 Aug. 26, 2010

(30) Foreign Application Priority Data

Sep. 19, 2007 (KR) .................. 10-2007-0095518

(51) Int. Cl.
*H04N 7/173* (2011.01)
*H04N 7/14* (2006.01)
*G06Q 10/00* (2012.01)
*G06Q 99/00* (2006.01)
*G06F 3/00* (2006.01)
*G06F 15/16* (2006.01)

(52) U.S. Cl. ..... 725/116; 725/93; 348/14.01; 348/14.08; 348/14.09; 348/14.1; 348/14.16; 705/300; 705/301; 705/319; 715/751; 715/753; 715/756; 709/204; 709/205; 709/206

(58) Field of Classification Search .................. 725/116, 725/93; 348/14.01, 14.08, 14.09, 14.1, 14.16; 705/300, 301, 319; 715/751, 753, 756, 758; 709/204, 205, 206, 207
See application file for complete search history.

(56) References Cited

U.S. PATENT DOCUMENTS
7,822,811 B2 * 10/2010 Moore et al. .................. 709/204
(Continued)

FOREIGN PATENT DOCUMENTS
CN 1859566 A 11/2006
(Continued)

OTHER PUBLICATIONS
International Search Report: PCT/KR2008/001792.

*Primary Examiner* — Hoang-Vu A Nguyen-Ba
(74) *Attorney, Agent, or Firm* — Ladas & Parry LLP

(57) ABSTRACT

There is provided a interactive IPTV broadcasting service system of user participation, the system including: a broadcast controller reserving time of IPTV broadcast channels to perform an IPTV broadcast according to the reserved time, notifying user participation to accept the user participation during the broadcasting service, and controlling so that video of the user making a request for participation in broadcasting is included in video of the broadcast in progress, and then broadcast, a plurality of clients each notifying the broadcast controller of the request of the corresponding user when the participation in broadcasting is requested according to a selection of the IPTV broadcasting user and generating video and audio traffic of the corresponding user, and a media server relaying the users' participation in broadcasting between the broadcast controller and the clients, and receiving and mixing video and audio traffic of a broadcaster and the video and audio traffic of each of the users making the requests for the participation in broadcasting. Accordingly, the broadcaster can synthesize videos of users into broadcast contents.

22 Claims, 15 Drawing Sheets

U.S. PATENT DOCUMENTS

| | | | |
|---|---|---|---|
| 8,020,099 B1 * | 9/2011 | Lu | 715/720 |
| 2007/0156815 A1 * | 7/2007 | Mate et al. | 709/204 |
| 2007/0169156 A1 | 7/2007 | Zeng | 725/86 |
| 2008/0092178 A1 * | 4/2008 | McNamara et al. | 725/62 |
| 2011/0221860 A1 * | 9/2011 | Rideout | 348/14.09 |

FOREIGN PATENT DOCUMENTS

| | | | |
|---|---|---|---|
| JP | 2002-369175 A | | 12/2002 |
| JP | 2005-286409 A | | 10/2005 |
| KR | 1020010068461 A | | 7/2001 |
| KR | 20030018603 | * | 12/2003 |
| KR | 1020050102858 A | | 10/2005 |
| KR | 1020060126058 A | | 12/2006 |
| KR | 1020070064895 A | | 6/2007 |
| WO | 2005/104579 A1 | | 11/2005 |
| WO | 2006/004363 A1 | | 1/2006 |

* cited by examiner

SYSTEM AND METHOD FOR POSITIONING MULTIPLE BROADCAST CONTENT ON A USER INTERFACE

TECHNICAL FIELD

The present invention relates to a system and method for an interactive IPTV broadcasting service of user participation, and more particularly, to a system and method for an interactive IPTV broadcasting service of user participation that allows a broadcaster to synthesize videos of users into broadcast contents in real time and transmit the broadcast contents on IPTV broadcasting channels.

BACKGROUND ART

Interactive IPTV broadcasting allows a broadcaster to receive text-based data from users through the Internet or in a mobile environment and reflect the received text-based data in broadcast contents, or mix the text-based data with the broadcast contents in an overlay form to transmit the broadcast contents mixed with the text-based data.

Further, interactive IPTV broadcasting registers images or moving pictures generated by the users in broadcaster home-pages in real time on web-based and provides the registered images or moving pictures on broadcasting.

However, these cannot be called true user participation. Further, there is no invention that allows the broadcaster to synthesize the videos generated by the users with the broadcast contents in real time and transmit them to the IPTV broadcast channels.

DISCLOSURE OF INVENTION

Technical Problem

An aspect of the present invention provides a system and method for an interactive IPTV broadcasting service of user participation that allows a broadcaster to synthesize videos of users into broadcast contents in real time in an IPTV broadcasting system.

Technical Solution

According to an aspect of the present invention, there is provided an interactive IPTV broadcasting service system of user participation, the system including: a broadcast controller reserving time of IPTV broadcast channels to perform an IPTV broadcast according to the reserved time, notifying user participation to accept the user participation during the broadcasting service and controlling so that video of the user making a request for participation in broadcasting is included in video of the broadcast in progress, and then broadcast; a plurality of clients each notifying the broadcast controller of the request of the corresponding user when the participation in broadcasting is requested according to a selection of the IPTV broadcasting user and generating video and audio traffic of the corresponding user; and a media server relaying the users' participation in broadcasting between the broadcast controller and the clients and receiving and mixing video and audio traffic of a broadcaster and the video and audio traffic of the users making the requests for the participation in broadcasting.

The interactive IPTV broadcasting service system of user participation may further include a platform server storing the time of the IPTV broadcast channels reserved by the broadcast controller and multicasting broadcast streams transmitted from the media server at the reserved time on the IPTV channels.

When requests for participation in broadcasting of the users making the requests for the participation in broadcasting in response to a user participation notification of the broadcast controller are generated from the plurality of clients, the media server may store a list of the users making the requests for the participation in broadcasting as a waiting list, and then provide the stored waiting list to the broadcast controller.

When the waiting list is provided from the media server, the broadcast controller may select a list of the users allowed to participate in the broadcast in progress from the waiting list and provide the selected list of the users.

The media server may store the selected list of the users, provided from the broadcast controller, as a list of participants, notify the clients corresponding to the list of the participants of video participation, and receive video and audio traffic of the corresponding users from each of the clients.

When the list of the users allowed to participate in the broadcast is selected, the broadcast controller may generate video position information to include videos of the selected users in the broadcast in progress according to setting information of the broadcaster, transmit the generated video position information to the media server, and cause the media server to mix the video of the broadcaster and the videos of the users according to the video position information.

The broadcast controller may generate the video position information of the users according to predetermined position information when the video position information is not set by the broadcaster, and may transmit the generated video position information to the media server.

Each of the clients may generate a corresponding video participation request when the user makes the request for participation in broadcasting using video after the clients generate the requests for the participation in broadcasting of the users who want to participate in the broadcast in response to the user participation notification of the broadcast controller, and then the client may transmit video and audio traffic of the corresponding user to the media server when the broadcast controller receives the video participation request and makes a response to the video participation.

The broadcaster controller may control so that secondary contents selected by the broadcaster are further included in the broadcast in progress.

The broadcast controller may generate video position information of the secondary contents and transmit the generated video position information to the media server when the secondary contents need to be included in the broadcast in progress, such that the video of the secondary contents is mixed with the video of the broadcaster or the videos of the broadcaster and the users according to the video position information.

The broadcaster controller may include a menu for notifying user's participation in broadcasting, a waiting list, a control menu for selecting a video participant from the waiting list, a menu for providing secondary contents, a menu for setting position information of each video and a display screen UI for reserving broadcasting time of the IPTV channels.

According to another aspect of the present invention, there is provided an interactive IPTV broadcasting service method of user participation of a media server in an interactive IPTV broadcasting service system, the method including: notifying user participation to accept the user participation during the broadcasting service; storing a list of users making requests for the participation in broadcasting as a waiting list when request messages are received from the users; storing, when a list of the users allowed to participate in the broadcast in progress is selected from the waiting list, the selected users as a list of participants; responding to requests for video participation from the selected users; generating video and audio traffic from the selected users; and mixing and broadcasting video and audio traffic of a broadcaster and the video and audio traffic of the users.

The method may further include generating video position information according to setting information of the broadcaster to include the videos of the selected users in the broadcast in progress when the list of the users allowed to participate in the broadcast is selected, wherein the videos of the broadcaster and the users are mixed according to the video position information.

The method may further include generating the video position information of the users according to predetermined video information when the video position information of the users is not set by the broadcaster.

The method may further include including secondary contents selected by the broadcaster in the broadcast in progress.

The including secondary contents selected by the broadcaster in the broadcast in progress may include receiving video position information of the secondary contents selected by the broadcaster and included in the broadcast in progress and; and mixing video of the secondary contents with the video of the broadcaster or the videos of the broadcaster and the users according to the video position information.

According to still another aspect of the present invention, there is provided an interactive IPTV broadcasting service method of user participation of a broadcast controller in an interactive IPTV broadcasting service system, the method including: a first operation of checking whether a participatory broadcasting service request is inputted or not during a general broadcasting mode according to a reserved time; a second operation of displaying a participatory broadcast in progress on a display screen, converting the general broadcasting mode into a participatory broadcasting mode, and transmitting a participatory broadcasting service notification message to a media server when the participatory service request is inputted as the check result of the first operation; a third operation of checking whether information about a waiting list of users who request for video participation with respect to the participatory broadcast is inputted from the media server or not, updating the waiting list and displaying the updated waiting list on the display screen when the waiting list is inputted, and obtaining a list of participants selected by from the waiting list; a fourth operation of checking whether video position setting information about the obtained waiting list is inputted from the broadcaster or not and setting a predetermined position as a position of the participant video, when the video position setting information is not inputted; and a fifth operation of transmitting to the media server, a user participation request message including the position information of the participant video set by the broadcaster or the predetermined participant video to mix the video of the broadcaster and the videos of the users selected as the participants.

The method may further include a sixth operation of maintaining the current broadcast state when the secondary contents providing request is not inputted and checking whether the secondary contents are IPTV sources or local contents when the secondary contents providing request is inputted, if the participatory broadcasting service request is not inputted as the check result of the first operation.

The method may further include a seventh operation of checking whether a participation request message is transmitted from a client of the user in the waiting list of the media server or not when the information about the waiting list is not provided as the check result of the third operation; and an eighth operation of displaying an ID of the corresponding user who has received the participation request on the display screen when the participation request message of the user is transmitted and checking whether the broadcaster directly requests for the participation to the user when the participation request message of the user is not provided as the check result of the seventh operation.

The method may further include a ninth operation of checking whether there is a previously stored waiting list when the broadcaster directly requests for the participation in broadcasting to the user from broadcaster's input as the check result of the eighth operation, displaying an error message on the display screen when there is no waiting list, and then performing the third operation again.

The method may further include a tenth operation of displaying the waiting list on the display screen when the previously stored waiting list exists, checking whether video position setting information about videos of the displayed waiting list is inputted from the broadcaster or not, and setting a predetermined position as the video position when the image position setting information is not inputted.

The method may further include an eleventh operation of checking whether a secondary contents providing request is inputted from the broadcaster or not when the participatory broadcasting service request is not inputted as the check result of the eighth operation, performing the first operation again when the secondary contents providing request is not inputted, and performing the sixth operation again when the secondary contents providing request is inputted.

*The method may further include a first sub-operation of displaying a list of the IPTV sources or a list of the local contents on the display screen according to the check result of the sixth operation and causing the broadcaster to select the IPTV sources or the local contents used to form the broadcast video in progress; a second sub-operation of checking whether position setting information about secondary contents video of the selected IPTV sources or the local contents is inputted from the broadcaster or not; a third sub-operation of setting a predetermined position as a video position of the secondary contents when the position setting information of the secondary contents video is not inputted a result of the second sub-operation; a fourth sub-operation of transmitting to the media server, a secondary contents providing request message including the position setting information about the secondary contents video set by the broadcaster or the predetermined position information; a fifth sub-operation of transmitting the video of the broadcaster with the streams of the secondary contents to media server when receiving a response message corresponding to the secondary contents providing request message; and a sixth sub-operation of checking whether the participatory broadcasting service is performed or not while the secondary content stream is transmitted, maintaining the current broadcast state when the participatory broadcasting service is not performed, and performing the second operation again when the participatory broadcasting service is performed.

Advantageous Effects

As set forth above, the system and method for an interactive IPTV broadcasting service of user participation according to the exemplary embodiments of the present invention that changes passive users of the IPTV broadcasting service into users who directly participate in broadcasting through the interactive IPTV broadcasting system, and allows participants from remote areas to take part in broadcasting without a need for a broadcaster to invite guests from remote areas to a studio to thereby provide a variety of broadcasting services and reduce the time and costs required to invite the guests.

BEST MODE FOR CARRYING OUT THE INVENTION

Figure 1:
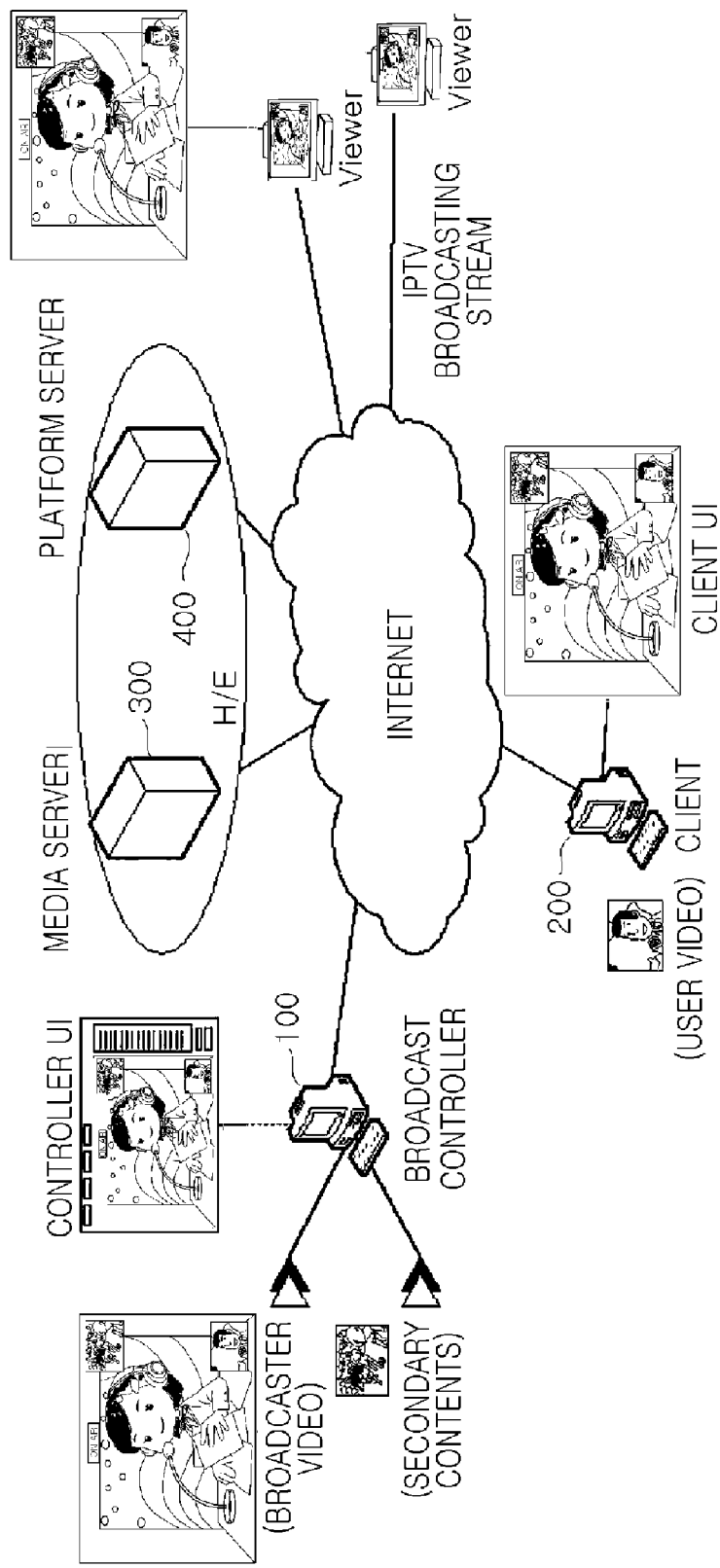
FIG. 1 is a configuration diagram illustrating an interactive IPTV broadcasting system of user participation according to an exemplary embodiment of the present invention.

Hereinafter, exemplary embodiments of the present invention will now be described in detail with reference to the accompanying drawings. However, in description of operation principles associated with the embodiments of the present invention, detailed description of a known art or configuration is omitted because it may obscure the spirit of the present invention unnecessarily. In the following description, well-known functions or configurations are not described in detail since they would obscure the invention in unnecessary detail.

Also, like reference numerals refer to like elements throughout the specification.

FIG. 1 is a configuration diagram illustrating an interactive IPTV broadcasting system of user participation according to an exemplary embodiment of the present invention.

Referring to FIG. 1, the interactive IPTV broadcasting system of user participation according to the exemplary embodiment of the present invention includes a broadcast controller 100, a plurality of clients 200, a media server 300 and a platform server 400.

In the interactive IPTV broadcasting system, the broadcast controller 100 controls interactive IPTV broadcasting and the clients 200 perform the same function as existing IPTV STBs and provide an interactive IPTV broadcasting service to users. The clients 200 include programs that provide the interactive IPTV service, which is participatory broadcasting.

The platform server 400 transmits actual broadcast streams to the users according to reserved time. The media server 300 controls the clients 200 that participate in the interactive IPTV broadcasting service. Further the media server 300 serves as a head end (H/E) of the media server 300 that mixes media streams that is flowed from the broadcast controller 100 and the clients 200.

Figure 2:
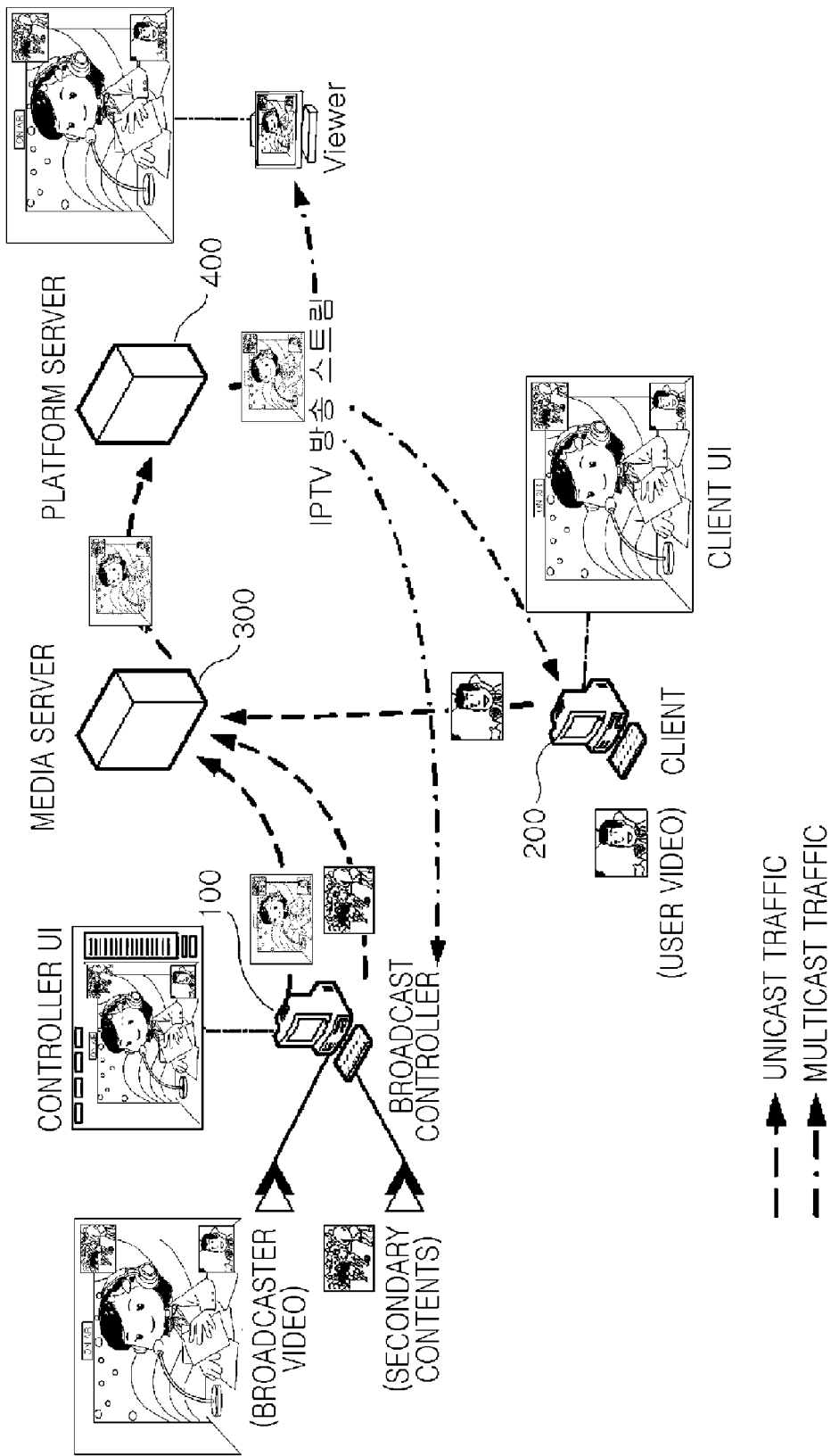
FIG. 2 is a diagram illustrating a flow of broadcast media streams in the interactive IPTV broadcasting system of user participation according to the exemplary embodiment of the present invention.

FIG. 2 is a diagram illustrating a flow of broadcasting media streams in the interactive IPTV broadcasting system of user participation according to the exemplary embodiment of the present invention.

Referring to FIG. 2, in the interactive IPTV broadcasting system, the broadcast controller 100 transmits media streams to media server 300 at a reserved broadcasting time. In here, media streams that contain video and audio of a broadcaster media streams contain video and audio of a broadcaster. Further, the broadcast controller 100 may transmit secondary contents selected by the broadcaster to the media server 300.

The media server 300 mixes video and audio contained in the respective media streams transmitted by the broadcast controller 100 and the clients 200 on the basis of control information that is set by the broadcaster, and transmits the mixed video and audio to the platform server 400. Here, the broadcast controller 100 and the clients 200 transmit the media streams to the media server 300 by unicast.

The platform server 400 provides participatory broadcasting service streams in which the video and audio of the broadcaster, the secondary contents and the users are mixed with each other to the client 200 of the user participating in broadcasting and all of the clients 200 who watch the corresponding broadcast by using a multicast address of the assigned channel.

Figure 3:
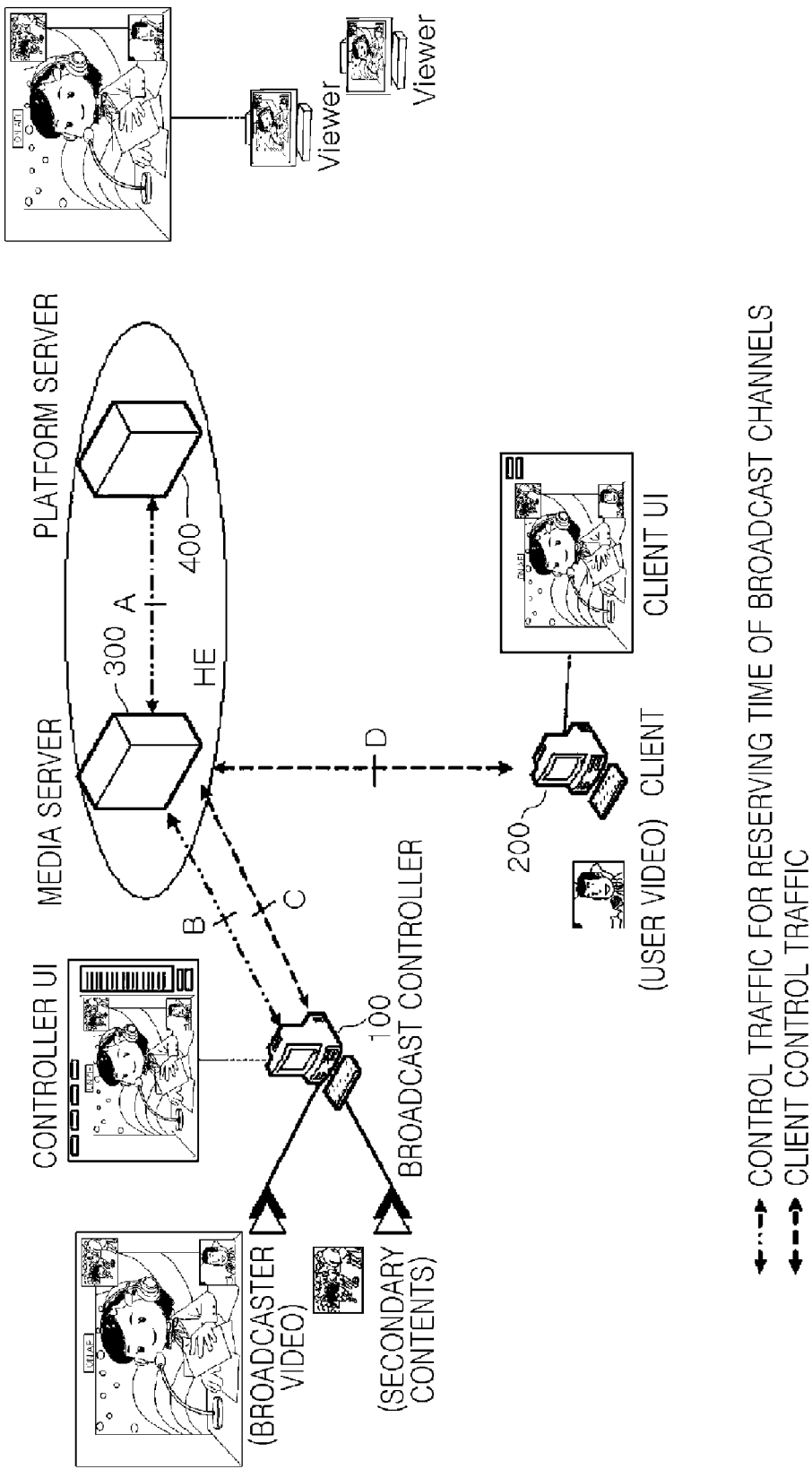
FIG. 3 is a diagram illustrating control interfaces between configuration nodes for control in the interactive IPTV broadcasting system of user participation according to the exemplary embodiment of the present invention.

FIG. 3 is a diagram illustrating control interfaces between configuration nodes that are defined to control the interactive IPTV broadcasting system according to the exemplary embodiment of the present invention.

As shown in FIG. 3, each of the interfaces A and B defines a control message to reserve time at which the broadcast controller 100 broadcasts through IPTV channels. Further, each of the interfaces A and B transmits the control message to the broadcast controller 100 at the reserved IPTV broadcasting time such that the broadcast controller 100 prepares for broadcasting.

Each of the interfaces C and D defines a control process that selects a user of participatory broadcasting, video positions of participants, that is, the broadcaster and the user, a video position of the secondary contents, information about participation requests of the participants. Here, the image positions of the broadcaster, the user and the secondary contents defined by the interface C may be controlled by the broadcast controller 100. That is, the broadcast controller 100 generates position information about the videos and transmits the position information to the media server 300. The media server 300 mixes the videos on the basis of the transmitted position information.

The interactive IPTV broadcasting service operation of the broadcast controller 100, the media server 300, the platform server 400 and the clients 200 that is performed by the interfaces A, B, C, and D will be described with reference to FIGS. 10 to 15.

Next, the configuration and operation of the components of the interactive IPTV broadcasting system will be described in brief.

Figure 4:
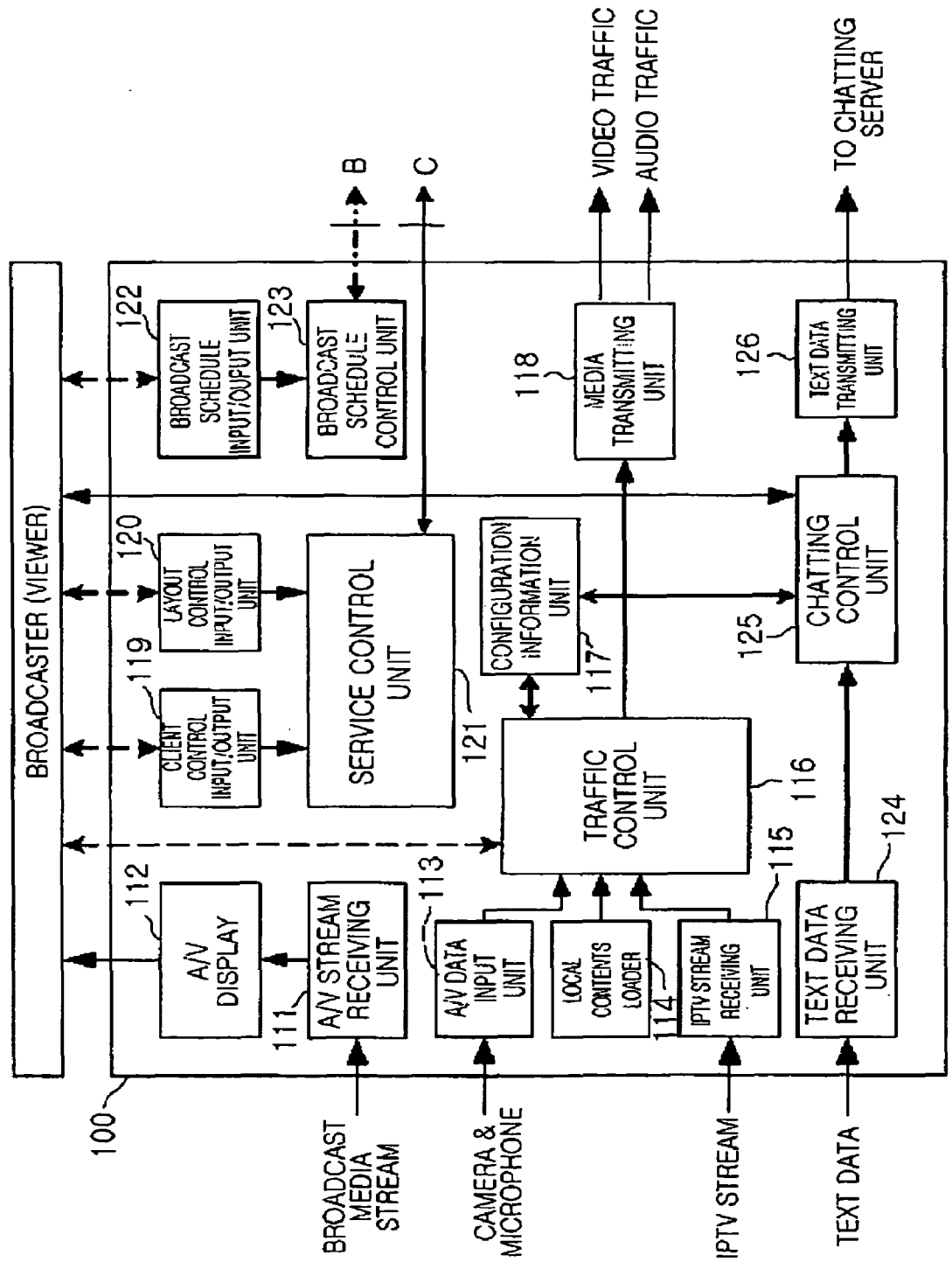
FIG. 4 is a configuration diagram illustrating a broadcast controller in the interactive IPTV broadcasting system of user participation according to the exemplary embodiment of the present invention.

FIG. 4 is a configuration diagram illustrating a broadcast controller of the interactive IPTV broadcasting system of user participation according to the exemplary embodiment of the present invention.

Referring to FIG. 4, the broadcast controller 100 includes an A/V stream receiving unit 111, an A/V display 112, an A/V data input unit 113, a local contents loader 114, an IPTV stream receiving unit 115, a traffic control unit 116, a configuration information unit 117, a media transmitting unit 118, a client control input/output unit 119, a layout control input/output unit 120, a service control unit 121, a broadcast schedule input/output unit 122, a broadcast schedule control unit 123, a text data receiving unit 124, a chatting control unit 125, and a text data transmitting unit 126.

The broadcast controller 100 having the above-described configuration outputs broadcast media streams received by the A/V stream receiving unit 111 to the A/V display 112. Then, the traffic control unit 116 of the broadcast controller 100 controls video and audio received by the A/V data input unit 113 through a camera and a microphone, local contents selected by the local contents loader 114 and IPTV streams received by the IPTV stream receiving unit 115, which then pass through the media transmitting unit 118 to be output as respective video and audio streams. Here, the traffic control unit 116 may control the videos, the audios, the local contents and the IPTV streams with reference to the configuration information unit 117.

The broadcast controller 100 controls participation in broadcasting of the clients 200 by the client control input/output unit 119 and the layout control input/output unit 120 that are connected to the service control unit 121, and sets the video positions of the broadcaster, the user, and the secondary contents.

Further, the broadcast controller 100 causes the broadcast schedule input/output unit 122 and the broadcast schedule control unit 123 to reserve IPTV broadcasting time according to a selection of the broadcaster, causes the chatting control unit 125 to control text data received by the text data receiving unit 124 with reference to the configuration information unit 117, and then causes the text data transmitting unit 126 to output the text data to a chatting server (not shown).

Figure 5:
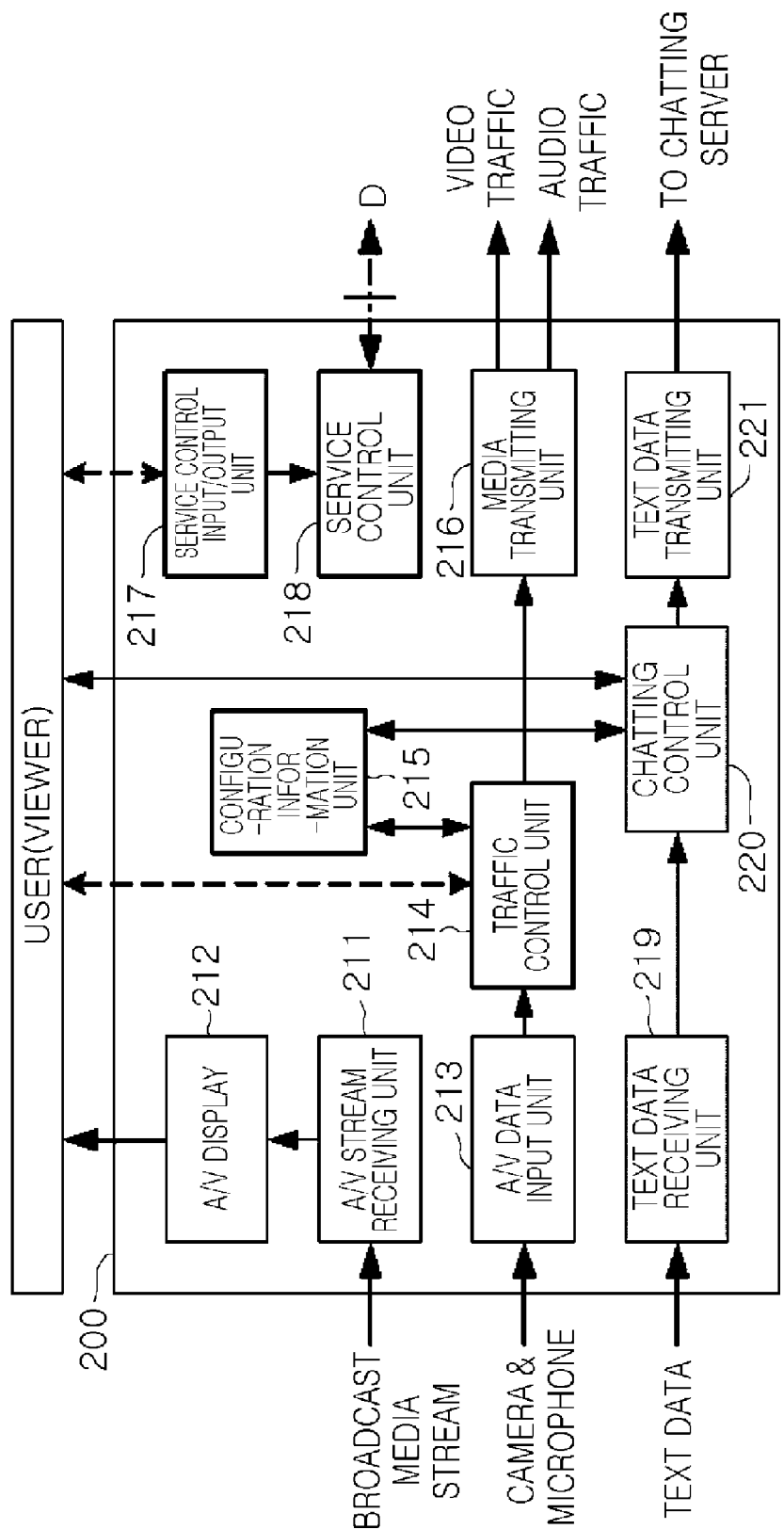
FIG. 5 is a configuration diagram illustrating a client in the interactive IPTV broadcasting system of user participation according to the exemplary embodiment of the present invention.

FIG. 5 is a configuration diagram illustrating a client of the interactive IPTV broadcasting system of user participation according to the exemplary embodiment of the present invention.

Referring to FIG. 5, the client 200 includes an A/V stream receiving unit 211, an A/V display 212, an A/V data input unit 213, a traffic control unit 214, a configuration information unit 215, a media transmitting unit 216, a service control input/output unit 217, a service control unit 218, a text data receiving unit 219, a chatting control unit 220, and a text data transmitting unit 221.

The client 200 having the above-described configuration outputs broadcast media streams received by the A/V stream receiving unit 211 to the A/V display 212, causes the traffic control unit 214 to control video and audio inputted to the A/V data input unit 213 through a camera and a microphone with reference to the configuration information unit 215, and then causes the media transmitting unit 216 to output respective video and audio streams.

Further, the client 200 controls participation in broadcasting of the users by the service control input/output unit 217 that is connected to the service control unit 218. Further, the client 200 controls text data received by the text data receiving unit 219 by the chatting control unit 220 referring to the configuration information unit 215, and then causes the text data transmitting unit 221 to output the text data to a chatting server (not shown).

Figure 6:
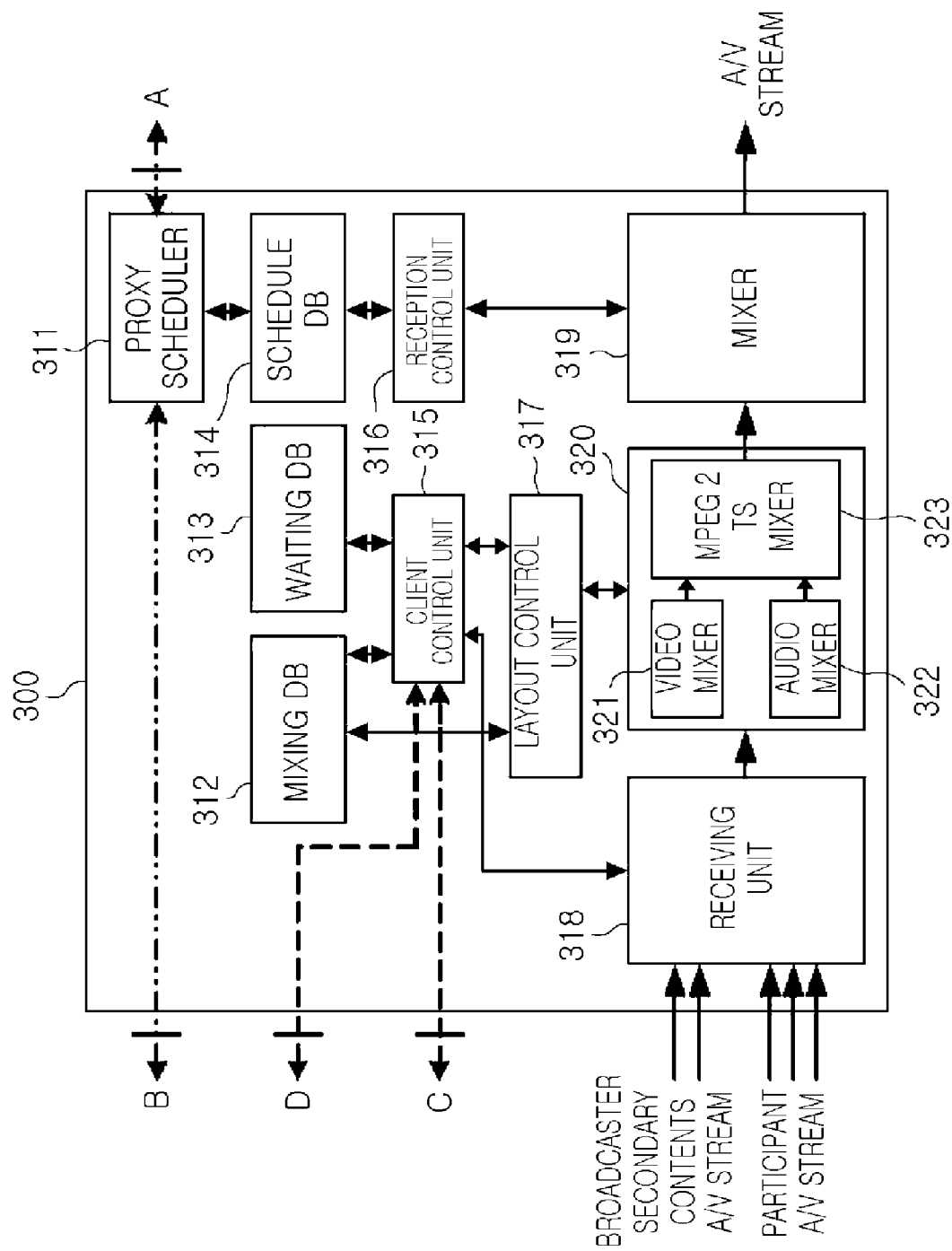
FIG. 6 is a configuration diagram illustrating a media server in the interactive IPTV broadcasting system of user participation according to the exemplary embodiment of the present invention.

FIG. 6 is a configuration diagram illustrating a media server of the interactive IPTV broadcasting system of user participation according to the exemplary embodiment of the present invention.

Referring to FIG. 6, the media server 300 includes a proxy scheduler 311, a mixing DB 312, a waiting DB 313, a schedule DB 314, a client control unit 315, a reception control unit 316, a layout control unit 317, a receiving unit 318, a mixer 320, and a transmitting unit 319.

The media server 300 having the above-described configuration causes the proxy scheduler 311 to store reservation time information about IPTV broadcasting of a broadcast scheduler in the platform server 400, and allows reception and transmission of the information related to broadcasting reservation between the broadcast scheduler and the platform server 400 by the interfaces A and B. Here, the media server 300 stores the broadcasting reservation time information in the schedule DB 314.

The media server 300 causes the client control unit 315 to receive video position information of the broadcaster, the user and the secondary contents that is provided from the broadcast controller 100 through the interface C, the information on the selection of the user to participate in broadcasting that is provided from the broadcast controller 100 through the interfaces C and D and the information about the requests for participation in broadcasting that is provided from the client 200.

The client control unit 315 transmits the position information about each of the videos to the layout control unit 317, and stores the position information about the client 200 receiving the request for participation in broadcasting in the waiting DB 313, and the information about the client 200 determined as the user to participate in broadcasting in the mixing DB 312.

When the receiving unit 318 receives the media streams of the broadcaster, the user, and the secondary contents from the broadcast controller 100 and the client 200, the video and audio of each of the media streams are mixed by the mixer 320 referring to the layout control unit 317, and causes the transmitting unit 319 to output the mixed media streams. Here, the mixer 320 includes a video mixer 321, an audio mixer 322 and an MPEG2 TS mixer and mixes the video and audio of the media streams.

Figure 7:
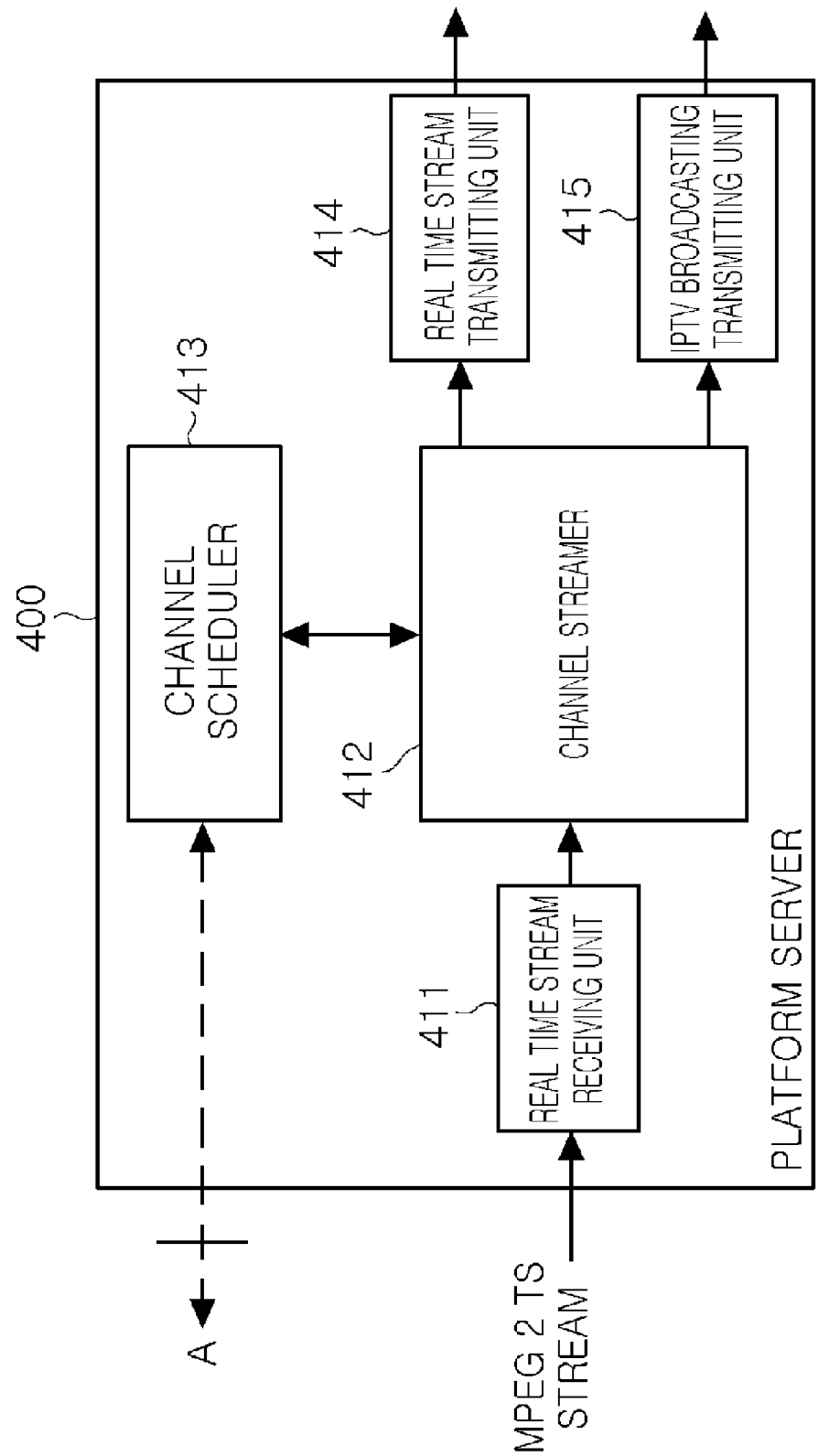
FIG. 7 is a configuration diagram illustrating a platform server in the interactive IPTV broadcasting system of user participation according to the exemplary embodiment of the present invention.

FIG. 7 is a configuration diagram illustrating a platform server of the interactive IPTV broadcasting system of user participation according to the exemplary embodiment of the present invention.

Referring to FIG. 7, the platform server 400 includes a real time stream receiving unit 411, a channel streamer 412, a channel scheduler 413, a real time stream transmitting unit 414, and an IPTV broadcasting transmitting unit 415.

When the real time stream receiving unit 411 receives media streams, the platform server 400 having the above-described configuration causes the channel streamer 412 to determine a channel through which the corresponding media streams are transmitted, and to output the corresponding media streams to the real time stream transmitting unit 414 and the IPTV broadcasting transmitting unit 415.

The platform server 400 receives and stores the broadcast reservation information, provided through the interface A, from the channel scheduler 413. Further, the platform server 400 causes the channel streamer 412 to determine the channel, through which the media streams are transmitted, with reference to the channel scheduler 413 that includes the broadcast reservation information.

Figure 8:
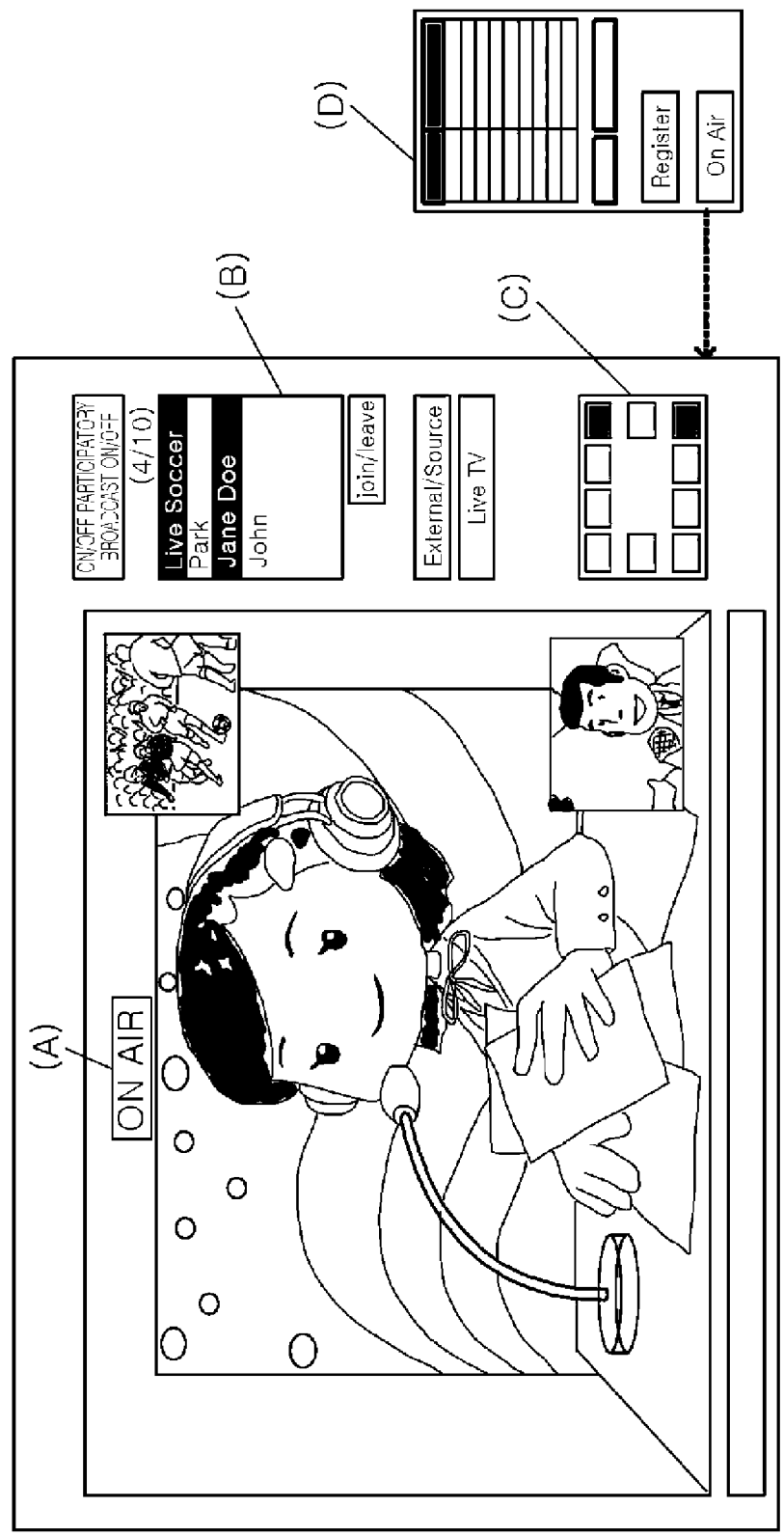
FIG. 8 is a diagram illustrating a screen UI of the broadcast controller in the interactive IPTV broadcasting system of user participation according to the exemplary embodiment of the present invention.

FIG. 8 is a diagram illustrating a screen UI of the broadcast controller of the interactive IPTV broadcasting system of user participation according to the exemplary embodiment of the present invention.

Referring to FIG. 8, the broadcast controller 100 that displays broadcasting on and off on a broadcast screen top A provides a waiting list B on the screen. Further, the broadcast controller 100 provides a control menu of 'join/leave' to select video participants from the waiting list, 'External Source' and 'Live TV' menus to provide secondary contents, a menu C to set position information of each of the videos, and a menu D to reserve time according to IPTV channels.

Figure 9:
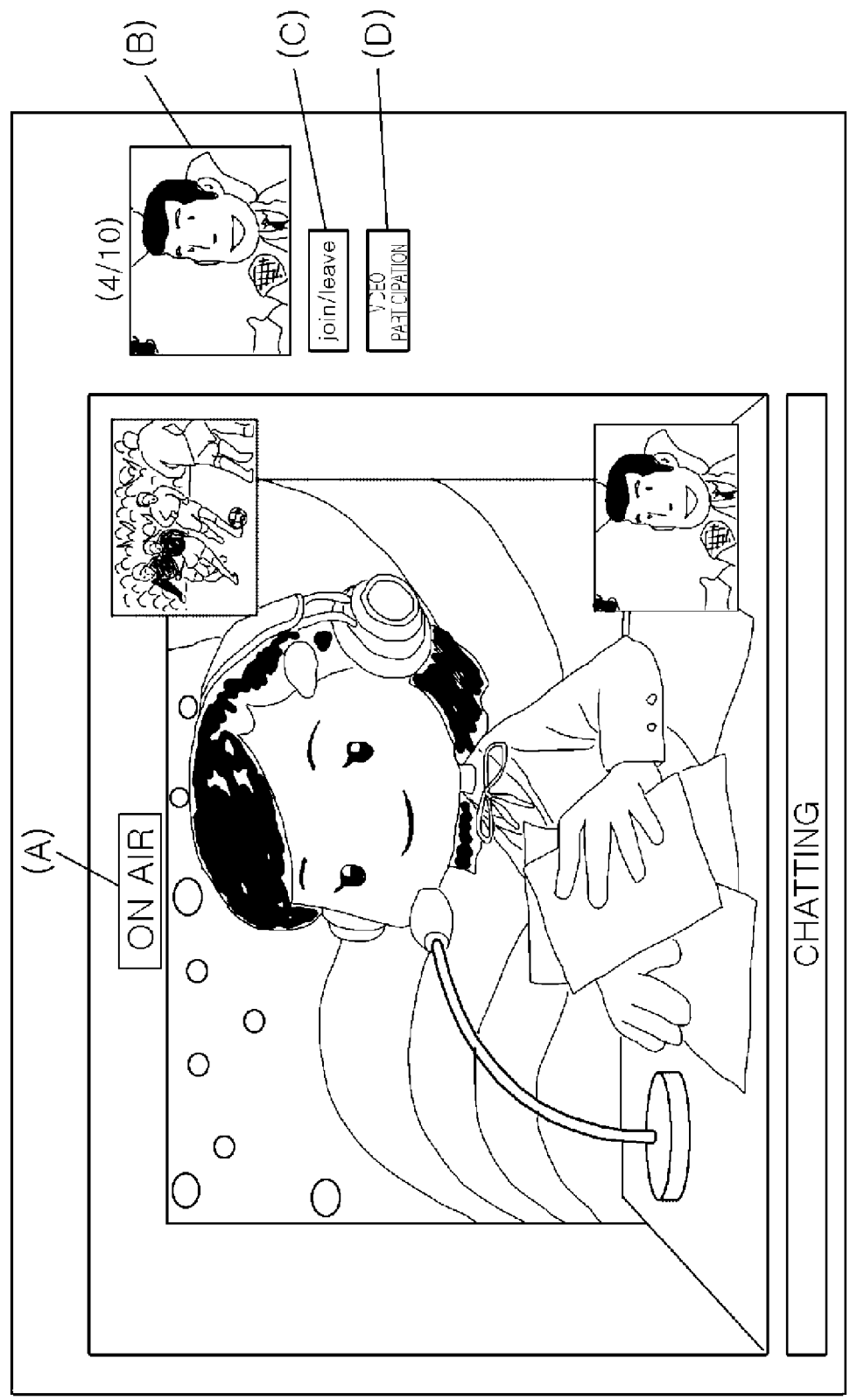
FIG. 9 is a diagram illustrating a screen UI of the client in the interactive IPTV broadcasting system of user participation according to the exemplary embodiment of the present invention.

FIG. 9 is a diagram illustrating a screen UI of the client in the interactive IPTV broadcasting system of user participation according to the exemplary embodiment of the present invention.

Referring to FIG. 9, unlike the broadcast controller UI, the client 200 that displays broadcasting on and off on a broadcast screen top A, provides video B of a corresponding user in addition to broadcast video, a menu C to request for participation in broadcasting, and a menu D to request for video participation.

Figure 10:
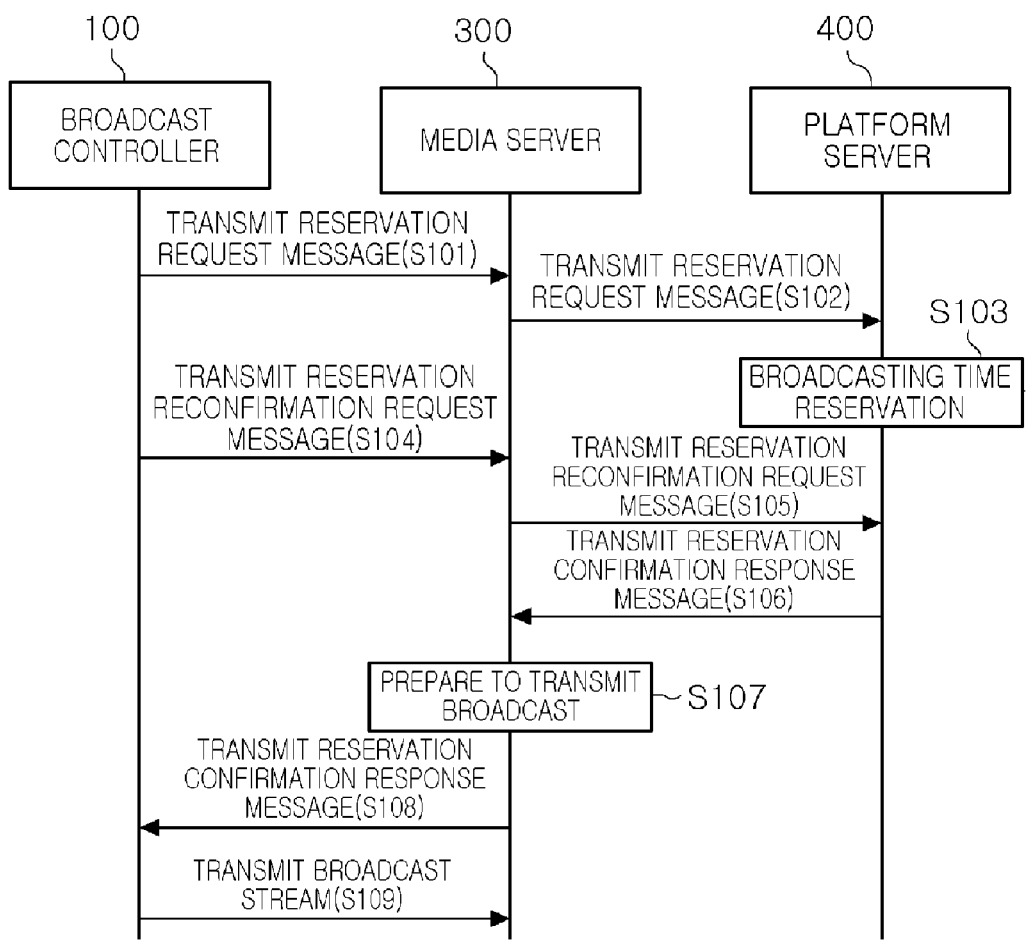
FIG. 10 is a signal flowchart illustrating a process of reserving time of IPTV broadcast channels in the interactive IPTV broadcasting system of user participation according to the exemplary embodiment of the present invention.

FIG. 10 is a signal flowchart illustrating a process of reserving time according to IPTV broadcasting channels in the interactive IPTV broadcasting system of user participation according to the exemplary embodiment of the present invention.

Referring to FIG. 10, since the broadcast controller 100 in the interactive IPTV broadcast system needs to previously reserve broadcasting time before broadcasting, the broadcast controller 100 transmits a reservation request message including broadcasting time information to the media server 300 (S101).

The media server 300 transmits the reservation request message transmitted from the broadcast controller 100 to the platform server 400 (S102), and causes the platform server 400 to reserve the broadcasting time (S103).

The broadcast controller 100 having reserved the broadcasting time transmits a reservation reconfirmation message to reconfirm the reservation to the media server 300 (S104), and causes the media server 300 to transmit the corresponding reservation reconfirmation message to the platform server 400 (S105).

The platform server 400 transmits a reservation confirmation response message as a response to the reservation reconfirmation request message to the media server 300 (S106), and the media server 300 having received the reservation reconfirmation response message prepares to transmit the broadcast (S107).

Then, the media server 300 transmits the reservation confirmation response message transmitted from the platform server 400 to the broadcast controller 100 (S108), and causes the broadcast controller 100 to transmit broadcast streams to the media server 300 according to the broadcasting time (S109).

Then, a method of controlling clients in the interactive IPTV broadcasting system that reserves broadcast reservation time and transmits broadcast streams at the corresponding reservation time according to the above-described procedure will be described.

Figure 11:
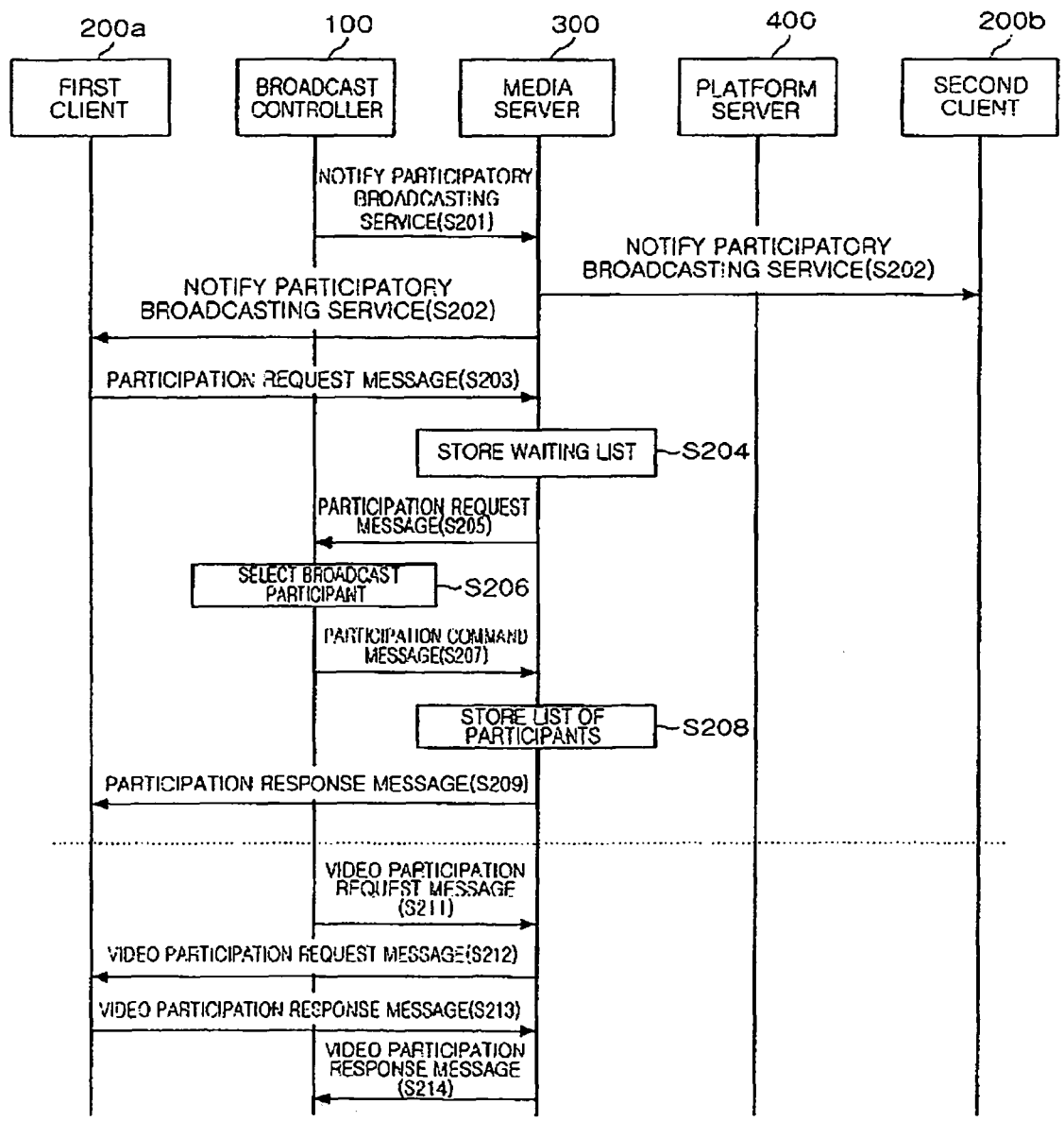
FIG. 11 is a signal flowchart illustrating a process of controlling the client in the interactive IPTV broadcasting system of user participation according to the exemplary embodiment of the present invention.

FIG. 11 is a diagram illustrating a process of controlling clients in the interactive IPTV broadcasting system of user participation according to the exemplary embodiment of the present invention.

Referring to FIG. 11, when the broadcast controller 100 allows a user to participate in a broadcast in progress while transmitting broadcast streams to the media server 300 according to the broadcast, the broadcast controller 100 transmits a participatory broadcasting service notification message to the media server 300 (S201). Further, the broadcast controller 100 causes the media server 300 to transmit the participatory broadcasting service notification message to all of the clients 200 of the users who are watching the broadcast (S202).

All of the clients 200 having received the participatory broadcasting service notification message notify the users of the start of the participatory broadcast through the display screen. When the user checks the start of the participatory broadcast and inputs a request for participating in the corresponding broadcast, the client 200 sends a participation request message to the media server 300 (S203). FIG. 11 is a diagram illustrating one example in which a participation request message is generated from a first client 200a.

When the participation request message is transmitted from the first client 200a, the media server 300 registers the first client 200a in the waiting DB as an waiting list (S204), and transmits the participation request message including information about the waiting list of the registered broadcast participants to the broadcast controller 100 (S205).

When the participation request message is transmitted from the media server 300, the broadcast controller 100 displays the information about the waiting list included in the corresponding message on the display screen, and causes the broadcaster having checked the information to select broadcast participants (S206). Further, the broadcast controller 100 transmits a participation command message including information about a list of the selected broadcast participants to the media server 300 (S207).

When the participation command message is transmitted from the broadcast controller 100, the media server 300 obtains the information about the list of the broadcast participants from the corresponding participation command message and moves the obtained broadcast participants from the waiting list of the waiting DB to a participant list of the mixing DB (S208).

The media server 300 transmits to the first client 200a, which is an example of a participant who is allowed to participate in broadcasting, a participation response message in response to the participation request message (S209). The first client 200a transmits video of a corresponding user to the media server 300 such that the video of the corresponding user can be included in the broadcast in progress.

According to another exemplary embodiment of the invention, when the broadcast controller 100 having generated the participatory broadcasting service notification message checks a waiting list that is previously included and desires to make a user participate in a corresponding participatory broadcast, the broadcast controller 100 may transmit a video participation request message to the client 200 of the corresponding user (for example, first client 200a (S211 and S212).

Then, the first client 200a displays the video participation request on the display screen, and causes the media server 300 to transmit a video participation response message to the broadcast controller 100 according to a selection of the user who has checked the screen (S213 and S214).

Next, a process of controlling videos of the broadcaster, the secondary contents selected by the broadcaster, and the participating user during a broadcast in progress will be described.

Figure 12:
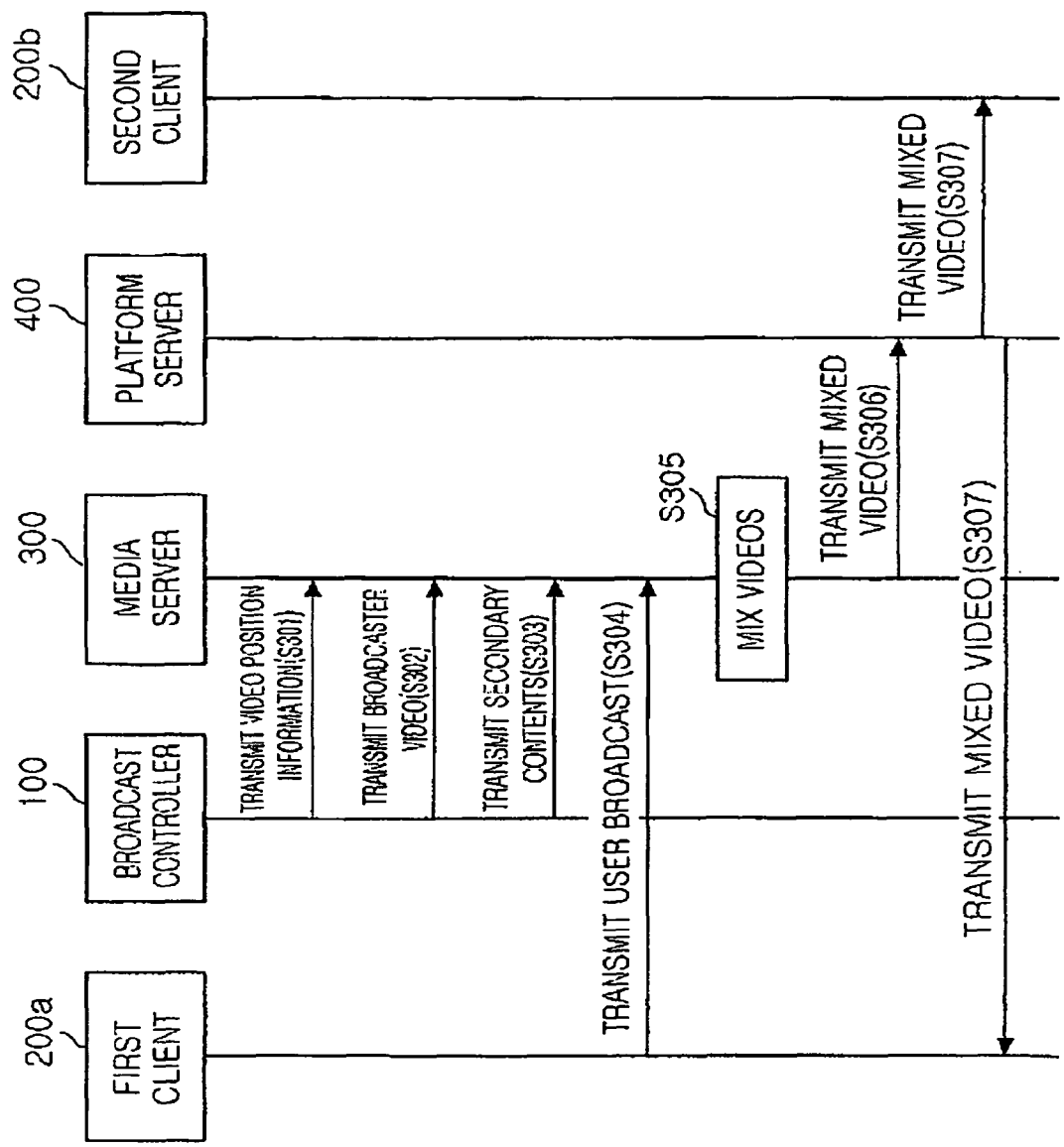
FIG. 12 is a signal flowchart illustrating a process of transmitting and mixing broadcast media streams in the interactive IPTV broadcasting system of user participation according to the exemplary embodiment of the present invention.

FIG. 12 is a signal flowchart illustrating a process of transmitting and mixing broadcast media streams in the interactive IPTV broadcasting system of user participation according to the exemplary embodiment of the present invention.

Referring to FIG. 12, the broadcast controller 100 that configures broadcast video by using secondary contents and video of a user allowed to participate in a broadcast in addition to video of the broadcaster during a broadcast in progress, generates video position information of the broadcaster, the secondary contents, and the user and transmits the generated information to the media server 300 (S301).

Then, the media server 300 receives broadcaster video provided from the broadcast controller 100, the secondary contents, and user video provided from the first client 200a allowed to participate in the broadcast (S302, S303, and S304), and mixes the received videos according to the video position information (S305).

When the media server 300 transmits broadcast streams of the mixed videos to the platform server 400 (S306), the broadcast streams of the mixed videos are transmitted to the clients 200a and 200b of the broadcasting users (S307).

Figure 13:
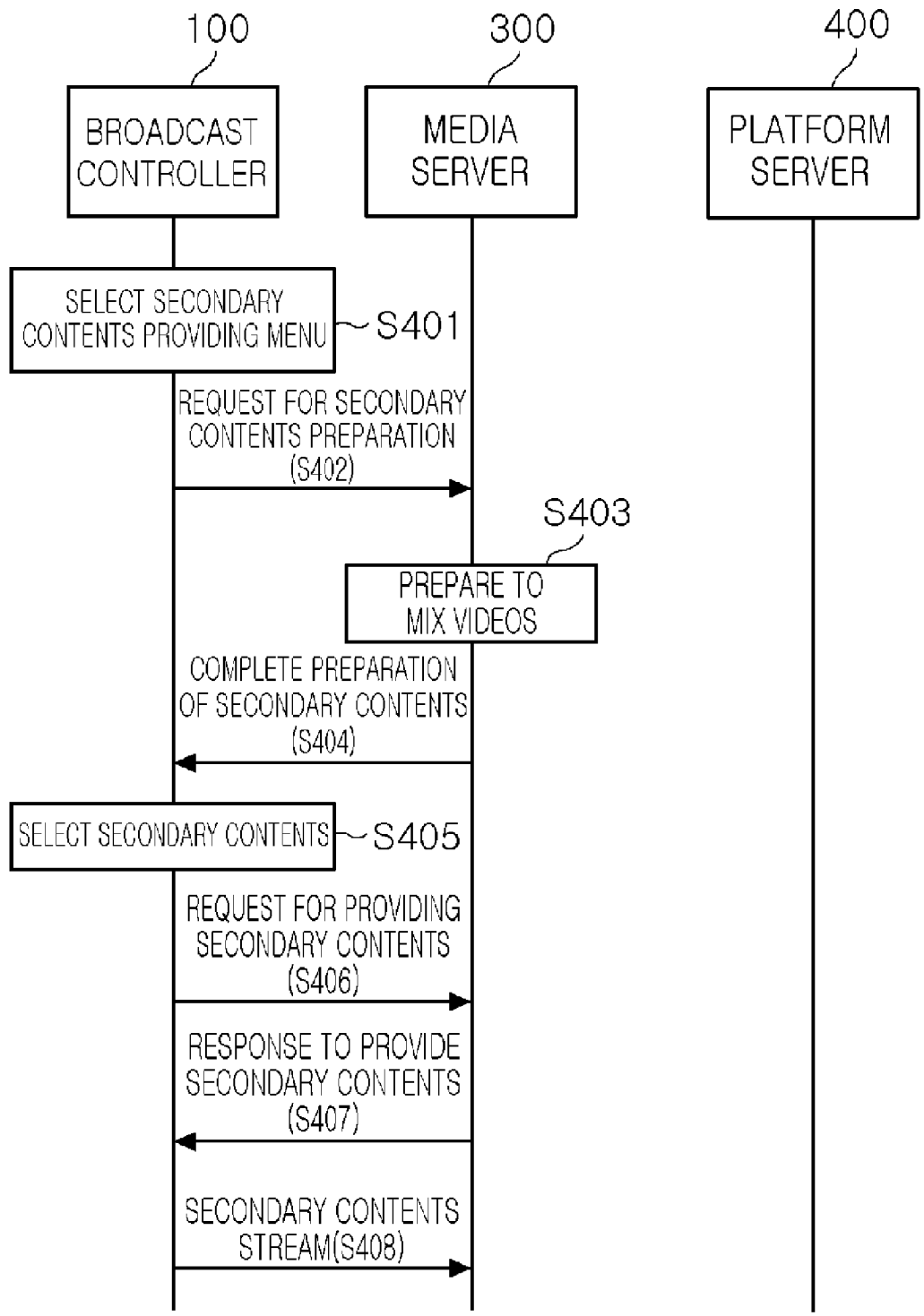
FIG. 13 is a signal flowchart illustrating a process of providing secondary contents by the broadcast controller in the interactive IPTV broadcasting system of user participation according to the exemplary embodiment of the present invention.

FIG. 13 is a signal flowchart illustrating a process of providing secondary contents by the broadcast controller of the interactive IPTV broadcasting system of user participation according to the exemplary embodiment of the present invention.

Referring to FIG. 13, when a broadcaster selects a secondary contents providing menu displayed on the display screen of the broadcast controller 100 (S401), the broadcast controller 100 transmits a secondary contents preparation request message to the media server 300 (S402).

The media server 300 prepares to mix video of the secondary contents according to the secondary contents preparation request message transmitted from the broadcast controller 100 (S403), and transmits a secondary contents-ready message to the broadcast controller 100 when the secondary contents are ready (S404).

When the broadcast controller 100 receives the secondary content-ready message from the media server 300, and the broadcaster selects secondary contents from the secondary contents providing menu to form broadcast video and plays the selected secondary contents (S405), the broadcast controller 100 transmits a secondary contents provision request message to the media server 300 (S406).

When a secondary contents providing response message in response to the secondary contents providing request message is transmitted from the media server 300 (S407), the broadcast controller 100 transmits streams of the secondary contents selected and played by the broadcaster to the media server 300 (S408).

Here, the secondary contents may be IPTV sources or contents owned by the broadcast controller 100.

The operations of the broadcast controller 100 and the clients 200 will be described in detail.

Figure 14:
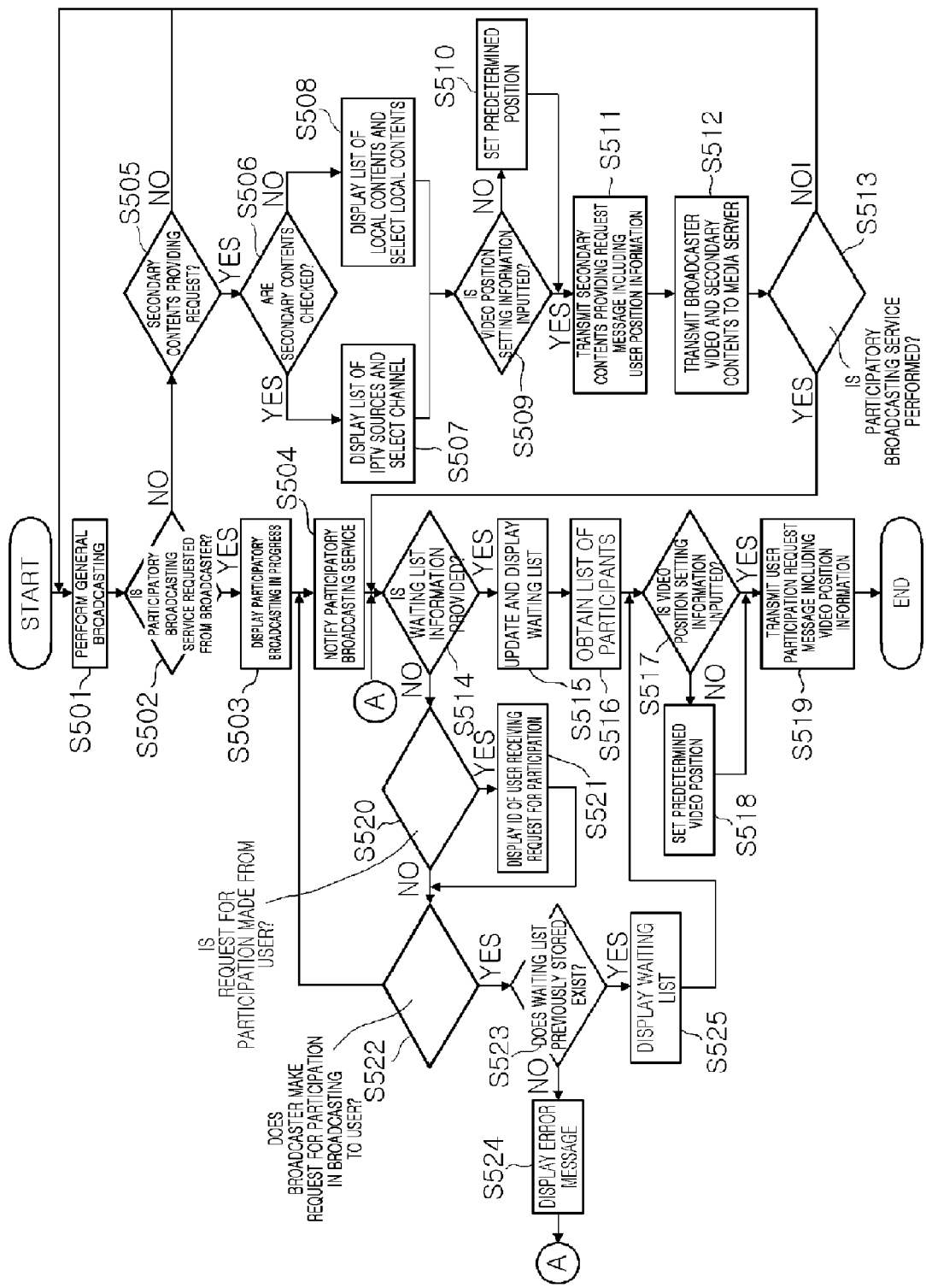
FIG. 14 is a flowchart illustrating the operation of the broadcast controller in the interactive IPTV broadcasting system of user participation according to the exemplary embodiment of the present invention.

FIG. 14 is a flowchart illustrating the operation of the broadcast controller of the interactive IPTV broadcasting system of user participation according to the exemplary embodiment of the present invention.

Referring to FIG. 14, the broadcast controller 100 that performs general broadcasting according to a reserved time (S501) can check whether a participatory broadcasting service request is inputted from the broadcaster or not (S502). As a check result, when the participatory broadcasting service request is inputted, the broadcast controller 100 displays a participatory broadcast in progress on the display screen (S503).

The broadcast controller 100 converts from a general broadcasting mode to a participatory broadcasting mode, and transmits a participatory broadcasting service notification message to the media server 300 (S504).

However, when the participatory broadcasting service request is not inputted from the broadcaster, the broadcast controller 100 checks whether a secondary contents providing request is inputted from the broadcaster or not (S505). When the secondary contents providing request is not inputted, the broadcast controller 100 maintains the current broadcast state (S502). When the secondary contents providing request is inputted, the broadcast controller 100 checks whether the secondary contents to be provided by the broadcaster are IPTV sources or local contents (S506).

The broadcast controller 100 displays a list of the IPTV sources and a list of the local contents that are determined according to the check result, and causes the broadcaster to select the IPTV sources or the local contents that are used to form the broadcast video in progress (S507 and S508).Further, the broadcast controller 100 checks whether position setting information about secondary contents video of the selected IPTV sources or the local contents is inputted from the broadcaster (S509) or not. When the position setting information of the secondary contents video is not inputted, a predetermined position is set as a video position of the secondary contents (S510).

Then, the broadcast controller 100 transmits to the media server 300, a secondary contents providing request message that includes the position information about the secondary contents video that is set by the broadcaster or the predetermined position information (S511). When receiving a response message corresponding to the secondary contents providing request message, the broadcast controller 100 transmits the video of the broadcaster with the streams of the secondary contents to media server 300 (S512).

The broadcast controller 100 checks whether the participatory broadcasting service is performed or not while the secondary content stream is transmitted (S513). As a check result, when the participatory broadcasting service is not performed, the broadcast controller 100 maintains the current broadcast state (S501). When the participatory broadcasting service is performed, the broadcast controller 100 transmits a participatory broadcasting service notification message to the media server 300 (S504).

When the broadcast controller 100 is converted to the participatory broadcasting mode and transmits the participatory broadcasting service notification message to the media server 300, the broadcast controller 100 checks whether information about a waiting list of users who desire to participate in the participatory broadcast is transmitted from the media server 300 or not (S514).

As a check result, when the information about the waiting list is transmitted from the media server 300, the broadcast controller 100 updates the waiting list and displays the updated waiting list on the display screen (S515), and obtains a list of participants selected by the broadcaster who has checked the corresponding waiting list (S516).

Then, the broadcast controller 100 checks whether video position setting information about the obtained waiting list is inputted from the broadcaster or not (S517). As a check result, when the video position setting information is not inputted, the broadcast controller 100 sets a predetermined position as a position of the participant video (S518).

Then, the broadcast controller 100 transmits to the media server 300a, a user participation request message that includes the position information of the participant video that is set by the broadcaster or the predetermined participant video (S519), such that the video of the broadcaster with the video of the user selected as the participant are mixed by the media server 300.

When the information about the waiting list is not provided, the broadcast controller 100 checks whether a participation request message from the client 200 of the user in the waiting list of the media server 300 is transmitted by the media server 300 or not (S520).

When the participation request message of the user is transmitted from the media server 300, the broadcast controller 100 displays an ID of the corresponding user who has received the participation request on the display screen (S521). When the participation request message of the user is not provided, the broadcast controller 100 checks whether the broadcaster directly requests for the participation in broadcasting to the user (S522).

When it is checked that the broadcaster directly requests for the participation in broadcasting to the user from broadcaster's input, the broadcast controller 100 checks whether there is a waiting list that is previously stored (S523). When there is no waiting list, the broadcast controller 100 displays an error message on the display screen (S524), and then performs the operation of S514 again.

However, when the waiting list exists, the broadcast controller 100 displays the waiting list on the display screen (S525), checks whether video position setting information about videos of the displayed waiting list is inputted from the broadcaster (S517). When the image position setting information is not inputted, the broadcast controller 100 sets a predetermined position as the video position (S518).

Further, the broadcast controller 100 transmits to the media server 300, a user participation request message including position information about participant video that is set by the broadcaster or predetermined information about the participant video (S519), such that video of the broadcaster with video of the user selected as the participant are mixed by the media server 300.

The broadcast controller 100 checks whether the broadcaster directly requests for participation in broadcasting to the user (S522). As a check result, when it is determined that the broadcaster does not want to make the request for the participation in broadcasting to the user, the broadcast controller 100 checks whether a secondary contents providing request is inputted from the broadcaster (S505). When the secondary content providing request is not inputted, the broadcast controller 100 performs the operation of S514 again. When the secondary content providing request is inputted, the broadcast controller 100 performs the operation of S506.

Figure 15:
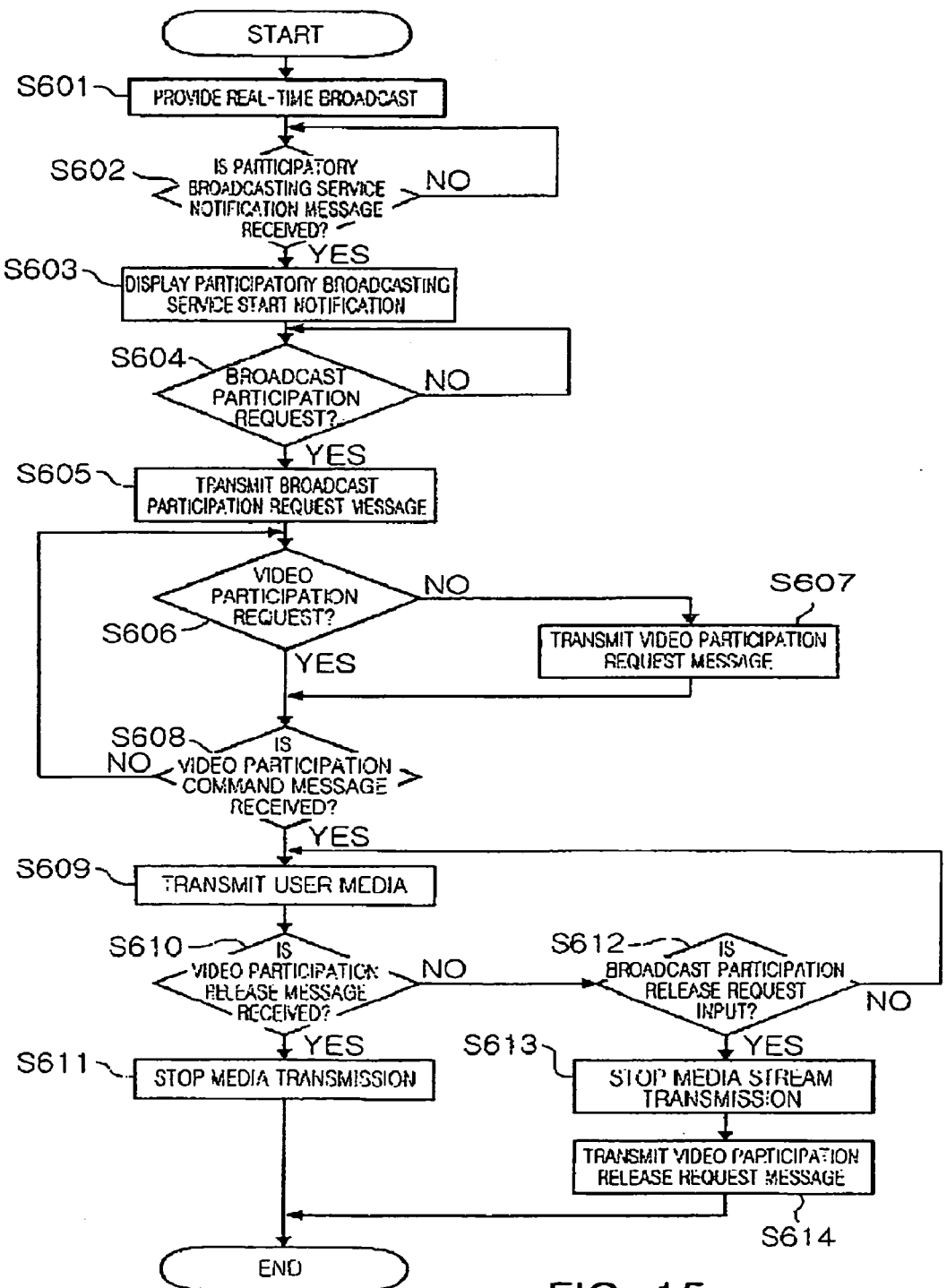
FIG. 15 is a flowchart illustrating the operation of the client in the interactive IPTV broadcasting system of user participation according to the exemplary embodiment of the present invention.

FIG. 15 is a flowchart illustrating the operation of the client of the interactive IPTV broadcasting system of user participation according to the exemplary embodiment of the present invention.

Referring to FIG. 15, when the client 200 that provides a real-time broadcast to the user according to a media stream provided from the platform server 400 (S601) receives a participatory broadcasting service notification message from the media server 300 (S602), the client 200 displays a participatory broadcasting service start notification on the display screen (S603).

When the user inputs a request for participation in broadcasting request after checking the display screen (S604), the client 200 transmits a participation request message to the media server 300 (S605).

The client 200 checks whether the user inputs a video participation request that is made for the user to participate in the corresponding broadcast by using video (S606). When the video participation request is inputted, the client 200 transmits the video participation request message to the media server 300 to transmit the corresponding request to the broadcast controller 100 (S607).

Then, when a command message corresponding to the video participation request message is transmitted from the media server 300 (S608), the client 200 transmits the media stream of the user to the media server 300 (S609).

When the video participation request is not inputted from the user, if a video participation command message is transmitted from the media server 300 (S608), the client 200 may transmit the media stream to the media server 300 according to a selection of the corresponding user (S609).

The client 200 that transmits the media stream of the user checks whether a video participation release message is received or not (S610). As a check result, when the video participation release message is received, the client 200 stops the transmission of the media stream (S611). When the video participation release message is not received, the client 200 checks whether a request for releasing participation in broadcasting is inputted from the user (S612).

As a check result, when the user inputs the request for releasing participation in broadcasting, the client 200 stops the transmission of the media stream (S613), and transmits a video participation release request message to the media server 300 (S614).

While the present invention has been shown and described in connection with the exemplary embodiments, it will be apparent to those skilled in the art that modifications and variations can be made without departing from the spirit and scope of the invention as defined by the appended claims.

The invention claimed is:

1. An interactive IPTV broadcasting service system of user participation, the system comprising:
a broadcast controller reserving time of IPTV broadcast channels to perform an IPTV broadcast according to the reserved time, notifying user participation to accept the user participation during the broadcasting service, and controlling so that video of the user making a request for participation in broadcasting is included in video of the IPTV broadcast in progress, and then broadcasts;

a plurality of clients each notifying the broadcast controller of the request of the corresponding user when the participation in broadcasting is requested according to a selection of the IPTV broadcasting user, and generating video and audio traffic of the corresponding user; and a media server relaying the users' participation in broadcasting between the broadcast controller and the clients, receiving and mixing video and audio traffic of a broadcaster and the video and audio traffic of each of the users making the requests for the participation in broadcasting from the broadcast controller and the clients, and wherein the broadcast controller generates video position information that includes a plurality of user videos in the broadcast according to position setting information, and the media server mixes the video of the broadcaster and the plurality of user videos according to the video position information.

2. The system of claim 1, further comprising a platform server storing the time of the IPTV broadcast channels reserved by the broadcast controller, and multicasting broadcast streams transmitted from the media server at the reserved time on the IPTV broadcast channels.

3. The system of claim 1, wherein when requests for participation in broadcasting of the users making the requests for the participation in broadcasting in response to a user participation notification of the broadcast controller are generated from the plurality of clients, the media server stores a list of the users making the requests for the participation in broadcasting as a waiting list, and then provides the stored waiting list to the broadcast controller.

4. The system of claim 3, wherein when the waiting list is provided from the media server, the broadcast controller selects a list of the users allowed to participate in the IPTV broadcast in progress from the waiting list and provides the selected list of the users.

5. The system of claim 4, wherein the media server stores the selected list of the users, provided from the broadcast controller, as a list of participants, notifies the clients corresponding to the list of the participants of video participation, and receives video and audio traffic of each of the corresponding users from each of the clients.

6. The system of claim 4, wherein when the list of the users allowed to participate in the IPTV broadcast is selected, the broadcast controller generates the video position information and transmits the generated video position information to the media server.

7. The system of claim 6, wherein when the video position information is not set by the broadcaster, the broadcast controller generates the video position information of the users according to predetermined position information and transmits the generated video position information to the media server.

8. The system of claim 3, wherein each of the clients generates a corresponding video participation request when the user makes the request for participation in broadcasting using video after the clients generate the requests for the participation in broadcasting of the users who want to participate in the IPTV broadcast in response to the user participation notification of the broadcast controller, and then the client transmits video and audio traffic of the corresponding user to the media server when the broadcast controller receives the video participation request and makes a response to the video participation request, and then provides the response to each of the clients.

9. The system of claim 1, wherein the broadcast controller controls so that secondary contents selected by the broadcaster are further included in the IPTV broadcast in progress.

10. The system of claim 9, wherein the broadcast controller generates video position information of the secondary contents and transmits the generated video position information to the media server when the secondary contents need to be included in the IPTV broadcast in progress, such that the video of the secondary contents is mixed with the video of the broadcaster or the videos of the broadcaster and the users according to the video position information.

11. The system of claim 1, wherein the broadcaster controller includes a menu for notifying users participation in broadcasting, a waiting list, a control menu for selecting a video participant from the waiting list, a menu for providing secondary contents, a menu for setting position information of each video, and a display screen VI for reserving broadcasting time of the IPTV broadcast channels.

12. An interactive IPTV broadcasting service method of user participation of a media server in an interactive IPTV broadcasting service system, the method comprising:
    notifying user participation to accept the user participation during the broadcasting service;
    storing a list of users making requests for the participation in broadcasting as a waiting list when request messages are received from the users;
    storing, when a list of the users allowed to participate in a broadcast in progress is selected from the waiting list, the selected users as a list of participants;
    responding to requests for video participation from the selected users;
    generating video and audio traffic from the selected users; and
mixing and broadcasting video and audio traffic of a broadcaster and the video and audio traffic of the users,
    further comprising generating video position information according to setting information of the broadcaster to include the videos of the selected users in the broadcast in progress when the list of the users allowed to participate in the broadcast is selected, wherein the videos of the broadcaster and the users are mixed according to the video position information.

13. The method of claim 12, further comprising generating the video position information of the users according to predetermined video information when the video position information of the users is not set by the broadcaster.

14. The method of claim 12, further comprising including secondary contents selected by the broadcaster in the broadcast in progress.

15. The method of claim 14, wherein the including secondary contents selected by the broadcaster in the broadcast in progress comprises:
    receiving video position information of the secondary contents selected by the broadcaster and included in the broadcast in progress; and
    mixing video of the secondary contents with the video of the broadcaster or the videos of the broadcaster and the users according to the video position information.

16. An interactive IPTV broadcasting service method of user participation of a broadcast controller in an interactive IPTV broadcasting service system, the method comprising:
    a first operation of checking whether a participatory broadcasting service request is inputted or not during a general broadcasting mode according to a reserved time;
    a second operation of displaying a participatory broadcast in progress on a display screen, converting the general broadcasting mode into a participatory broadcasting mode, and transmitting a participatory broadcasting service notification message to a media server when the participatory service request is inputted as a check result of the first operation;

a third operation of checking whether information about a waiting list of users who request for video participation with respect to the participatory broadcasting service request is inputted from the media server or not, updating the waiting list and displaying the updated waiting list on the display screen when the waiting list is inputted, and obtaining a list of participants selected from the waiting list;

a fourth operation of checking whether video position setting information about the obtained waiting list is inputted from the broadcaster or not and setting a predetermined position as a position of a participant video, when the video position setting information is not inputted; and a fifth operation of transmitting to the media server, a user participation request message including the position information of the participant video set by the broadcaster or the predetermined participant video to mix the video of the broadcaster and the videos of the users selected as the participants.

17. The method of claim 16, further comprising a sixth operation of maintaining a current broadcast state when a secondary contents providing request is not inputted and checking whether the secondary contents are IPTV sources or local contents when the secondary contents providing request is inputted, if the participatory broadcasting service request is not inputted as the check result of the first operation.

18. The method of claim 17, further comprising:

a seventh operation of checking whether a participation request message is transmitted from a client of the user in the waiting list of the media server or not when the information about the waiting list is not provided as the check result of the third operation; and an eighth operation of displaying an ID of the corresponding user who has received the participation request message on the display screen when the participation request message of the user is transmitted and checking whether the broadcaster directly requests for the participation to the user when the participation request message of the user is not provided as the check result of the seventh operation.

19. The method of claim 18, further comprising a ninth operation of checking whether there is a previously stored waiting list when the broadcaster directly requests for the participation in broadcasting to the user from broadcaster's input as the check result of the eighth operation, displaying an error message on the display screen when there is no waiting list, and then performing the third operation again.

20. The method of claim 19, further comprising a tenth operation of displaying the waiting list on the display screen when the previously stored waiting list exists, checking whether video position setting information about videos of the displayed waiting list is inputted from the broadcaster or not, and setting a predetermined position as the video position when the image position setting information is not inputted.

21. The method of claim 18, further comprising an eleventh operation of checking whether a secondary contents providing request is inputted from the broadcaster or not when the participatory broadcasting service request is not inputted as the check result of the eighth operation, performing the first operation again when the secondary contents providing request is not inputted, and performing the sixth operation again when the secondary contents providing request is inputted.

22. The method of claim 17, further comprising:

a first sub-operation of displaying a list of the IPTV sources or a list of the local contents on the display screen according to the check result of the sixth operation and causing the broadcaster to select the IPTV sources or the local contents used to form the broadcast video in progress;

a second sub-operation of checking whether position setting information about secondary contents video of the selected IPTV sources or the local contents is inputted from the broadcaster or not;

a third sub-operation of setting a predetermined position as a video position of the secondary contents when the position setting information of the secondary contents video is not inputted a result of the second sub-operation;

a fourth sub-operation of transmitting to the media server, a secondary contents providing request message including the position setting information about the secondary contents video set by the broadcaster or the predetermined position information;

a fifth sub-operation of transmitting the video of the broadcaster with the streams of the secondary contents to media server when receiving a response message corresponding to the secondary contents providing request message; and a sixth sub-operation of checking whether the participatory broadcasting service request is performed or not while the secondary content stream is transmitted, maintaining the current broadcast state when the participatory broadcasting service request is not performed, and performing the second operation again when the participatory broadcasting service request is performed.

* * * * *